United States Patent
Chang

(10) Patent No.: US 8,934,562 B2
(45) Date of Patent: Jan. 13, 2015

(54) EXPANSION ASSEMBLY FOR MIMO SYSTEM

(75) Inventor: Lee-Chuan Chang, Zhudong Township (TW)

(73) Assignee: Transystem Inc., Hsinchu (TW)

( * ) Notice: Subject to any disclaimer, the term of this patent is extended or adjusted under 35 U.S.C. 154(b) by 291 days.

(21) Appl. No.: 13/538,801

(22) Filed: Jun. 29, 2012

(65) Prior Publication Data

US 2013/0207875 A1 Aug. 15, 2013

(30) Foreign Application Priority Data

Feb. 15, 2012 (TW) .............................. 101104959 A

(51) Int. Cl.
*H04B 7/02* (2006.01)

(52) U.S. Cl.
USPC .............................. 375/267; 375/260; 375/259

(58) Field of Classification Search
USPC ........................................................ 375/267
See application file for complete search history.

(56) References Cited

U.S. PATENT DOCUMENTS

| | | | | |
|---|---|---|---|---|
| 5,982,242 | A | * | 11/1999 | Jun et al. ........................ 331/49 |
| 6,151,328 | A | * | 11/2000 | Kwon et al. .................. 370/441 |
| 7,139,324 | B1 | * | 11/2006 | Ylitalo et al. ................. 375/267 |
| 7,570,932 | B1 | * | 8/2009 | Folkmann .................. 455/127.1 |
| 2002/0158801 | A1 | * | 10/2002 | Crilly et al. ................... 342/378 |
| 2003/0123565 | A1 | * | 7/2003 | Fukuda et al. ............... 375/267 |
| 2008/0268797 | A1 | * | 10/2008 | Ahn et al. .................. 455/127.1 |
| 2011/0026624 | A1 | * | 2/2011 | Gummalla et al. ........... 375/260 |

\* cited by examiner

*Primary Examiner* — Michael Neff
(74) *Attorney, Agent, or Firm* — Maschoff Brennan

(57) ABSTRACT

The disclosure provides an expansion assembly configured to increase a transmitting distance of a MIMO system, the expansion assembly comprises N first RF front end units, N second RF front end units, a first power divider and combiner, and a second power divider and combiner. The first power divider and combiner connects with each of the first RF front end units, for delivering a first signal polarized in a first direction to the each of the first RF front end units. The second power divider and combiner connects with each of the second RF front end units, for delivering a first signal polarized in a first direction to the each of the second RF front end units. Accordingly, the first and second signal polarized in a second directions are capable of being transmitted in different directions, so as to implement the omni-directional transmission and increase the transmission distance.

10 Claims, 2 Drawing Sheets

US 8,934,562 B2

EXPANSION ASSEMBLY FOR MIMO SYSTEM

CROSS-REFERENCE TO RELATED APPLICATIONS

This non-provisional application claims priority under 35 U.S.C. §119(a) on Patent Application No(s). 101104959 filed in Taiwan, R.O.C. on Feb. 15, 2012, the entire contents of which are hereby incorporated by reference.

BACKGROUND

1. Technical Field

The disclosure relates to an expansion Assembly, and more particularly to an expansion Assembly for MIMO (multiple input and multiple output) system.

2. Related Art

In the radio communication (such as WiFi and WiMAX), the transmission distance and the transmission rate are associated with the type of antennas. For example, in order to send or receive radio signals in omni-direction manner, an omni-directional antenna applied with a WiFi model is used. However, in this case, large amounts of electric power are wasted on processing the radio signals in 360 degrees. Therefore, the transmission distance decreases. When a long transmission distance is required, the intensity of the signals become weaker as the transmission distance increases. In this case, the quality of the radio communication might be affected. Furthermore, as only a single antenna is used, the transmission rate is limited.

For addressing the problems as mentioned above, the radio communication using MIMO system has been developed. In the MIMO system, the transmission rate and the transmission quality are improved through the spatial degrees of freedom provided by the antennas for transmitting signals and the antennas for receiving signals. The MIMO system may operate in two primary function modes i.e., a spatial diversity mode and a spatial multiplexing mode.

The principle of the spatial diversity mode lies in that the effects of the attenuations in the channels may be adjusted by the multiple transmitting channels provided by the antennas on the transmitting end or the antennas on the receiving end. Therefore, in the spatial diversity mode, the attenuation in some weak signals may be compensated by selecting or combining the signals in the plurality of independent transmitting channels, so as to obtain the high-quality signals.

The principle of the spatial multiplexing mode lies in that the different data-sequences are transmitted by using multiple antennas. The difference data-sequences are extracted by using the spatial degrees of freedom provided by the antennas on the receiving end. Therefore, in the spatial multiplexing mode, the MIMO system is capable of transmitting a number of data sequences at the same time with one frequency band and one power. By this way, the transmission rate in the radio communication is increased dramatically.

However, for either the spatial diversity mode or the spatial multiplexing mode, once the transmitting distance increases, the quality of the transmission decreases. Although the quality of the signals in the spatial diversity mode can be maintained by selecting the high-quality channels in all the multiple transmitting channels, the fact is that the transmitting distance is difficult to be increased substantially. In the spatial diversity mode, when the transmitting distance increases, a transmitting path with slightly better quality can be selected from the transmitting channels in which all the signals have attenuations.

For increasing the transmitting distance, the radio signals are concentrated in one direction for transmission. However, the method mentioned above lose the advantage of transmitting signals in omni-direction. Therefore, it is difficult to reach balance between the transmitting distance and the omni-directionality for the radio communication module in the MIMO system.

SUMMARY

The disclosure provides an expansion assembly configured to increase a transmitting distance of a MIMO system. The expansion assembly comprises: N first RF front end units, N second RF front end units, a first power divider and combiner and a second power divider and combiner. The N first RF front end units connect with a first port in each of N antennas, and each of the first RF front end units is capable of processing a first signal polarized in a first direction. N second RF front end units connect with a second port in each of the antennas, and each of the second RF front end units is capable of processing a second signal polarized in a second direction. The first power divider and combiner is configured to divide and combine the first signal polarized in the first direction. The first power divider and combiner connects with each of the first power RF front end units. The second power divider and combiner is configured to deliver and combine the second signal polarized in a second direction. The second power deliver and combine unit is connects with each of the second power RF front end units.

For purposes of summarizing, some aspects, advantages and features of some embodiments of the invention have been described in this summary. Not necessarily all of (or any of) these summarized aspects, advantages or features will be embodied in any particular embodiment of the invention. Some of these summarized aspects, advantages and features and other aspects, advantages and features may become more fully apparent from the following detailed description and the appended claims.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Certain embodiments of the invention relate generally to electronic dispersion compensation systems and methods. However, the disclosed embodiments of systems and methods may be used in other contexts unrelated to electronic dispersion compensation.

Figure 1:
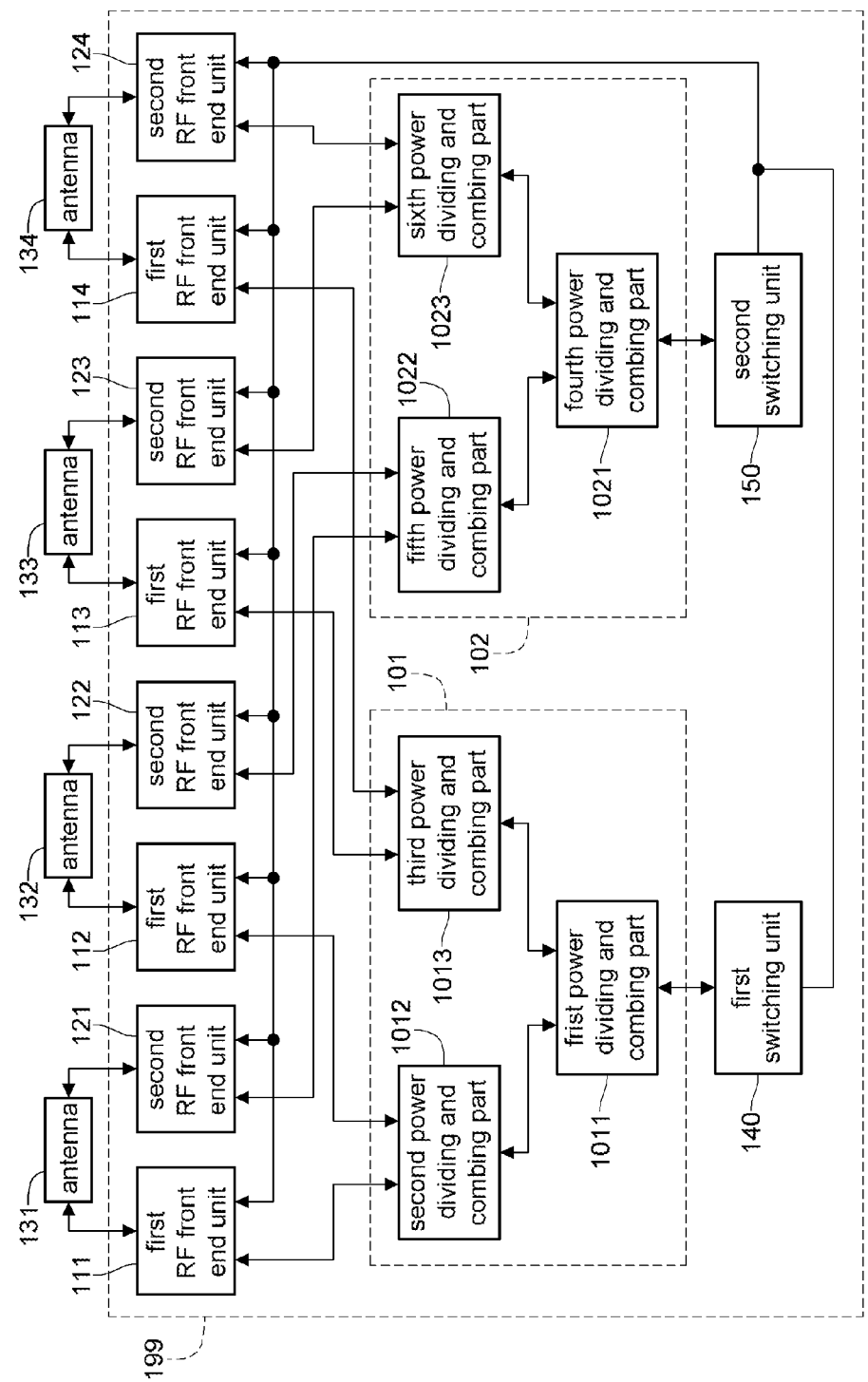
FIG. 1 is a structural diagram of an expansion assembly system according to an embodiment of the present disclosure.

FIG. 1 is a structural diagram of the expansion assembly according to the first embodiment in the embodiment. The expansion assembly 199 includes: first RF-front end units 111 to 114, second RF-front end units 121 to 124, a first power divider and combiner 101 and a second power divider and combiner 102.

In the embodiment, the expansion assembly 199 may be applied to a MIMO wireless communication system. The wireless communication system includes antennas 131 to 134, and each of the antennas has two ports. The antennas 131 to 134 may be, but is not limited to, orthogonal dual polarized antennas. For example, each of the antennas 131 to 134 includes a first port configured to transmit and receive vertically polarized signals, and a second port configured to transmit and receive horizontally polarized signals, but the disclosure is limited by this embodiment. In other embodiments, one port of each antennas 131 to 134 is capable of transmitting and receiving 45° polarized signals, while the another port is capable of transmitting and receiving −45° polarized signals.

In the expansion assembly 199, the first RF front end unit 111 connects with the antenna 131, the first RF front end unit 112 is capable of being connected with the antenna 132, the first RF front end unit 113 connects with the antenna 133, and the first RF front end unit 114 connects with the antenna 134. By the same way, the second RF front end unit 121 connects with the antenna 131, the second RF front end unit 122 connects with the antenna 132, the second RF front end unit 123 connects with the antenna 133, and the second RF front end unit 124 connects with the antenna 134.

In this embodiment, the first RF front end units 111 to 114 are capable of processing the vertically polarized signal, and the second RF front end units 121 to 124 are capable of processing the horizontally polarized signal. However, the disclosure is not limited by this embodiment. In other embodiments, the first RF front end units 111 to 114 are capable of processing the horizontally polarized signal, while the second RF front end units 121 to 124 are capable of processing the vertically polarized signal.

Each of the first RF front end units 111 to 114 and the second RF front end units 121 to 124 comprises: a power amplifier and a low-noise amplifier. In the case that the wireless communication system is in a signal-transmitting mode, the intensity of the vertically polarized signals are amplified by the power amplifiers, when the vertically polarized signals are processed by the first RF front end units 111 to 114. The intensities of the horizontally polarized signals are amplified by the power amplifiers, when the horizontally polarized signals are processed by the second RF front end units 121 to 124. In the case of the wireless communication system is operated in a signal-receiving mode, the intensity of the vertically polarized signals received are amplified by the low-noise amplifier, when the vertically polarized signals are processed by the first RF front end units 111 to 114. In this case, the intensities of the horizontally polarized signals received are amplified by the low-noise amplifier, when the horizontally polarized signal is processed by the second RF front end units 121 to 124.

The first power divider and combiner 101 connects with the first RF front end units 111 to 114, while the second power divider and combiner 102 connects with the second RF front end units 121 to 124. When the wireless communication system is operated in the signal-transmitting mode, the first power divider and combiner 101 is capable of delivering the vertically polarized signals to the first RF front end units 111 to 114, and the second power divider and combiner 102 is capable of delivering the horizontally polarized signals to the second RF front end units 121 to 124. On the other hand, when the wireless communication system is in the signal-receiving mode, the first power divider and combiner 101 is capable of delivering and combing the vertically polarized signals from the first RF front end units 111 to 114, and the second power divider and combiner 102 is capable of delivering and combing the horizontally polarized signals from the second RF front end units 121 to 124.

The first power divider and combiner 101 connects with the first RF front end units 111~114, and the second power divider and combiner 102 connects with the second RF front end units 121~124. Accordingly, in the expansion assembly 199 of the present disclosure, after the vertically polarized signals are delivered to the first RF front end units 111~114, the power loss of the vertically polarized signals caused in the delivering process is capable of being compensated by the power amplifier in the first RF front end units 111~114. By the same manner, after the horizontally polarized signals are delivered to the second RF front end units 121~124, the power loss of the horizontally polarized signals caused in the delivering process is capable of being compensated by the power amplifier in the second RF front end units 121~124. Therefore, the signals, which are compensated and transmitted through the antennas 131~134, may be transmitted for longer distance in the wireless communication. Accordingly, the MIMO wireless communication system provided with the expansion assembly in the present disclosure may expand the coverage area.

For transmitting the signals in a omni-directional manner, the antennas 131 to 134 are suitable for transmitting or receiving the signals in different spatial domains. In this embodiment, each one of the four antennas is applied to one spatial domain covering 90°. Accordingly, the combination of the spatial domains mentioned above is capable of covering a spatial domain having 360°. Combining the antennas mentioned above with the expansion assembly in the present disclosure, the MIMO wireless communication system has the advantages of increasing the transmitting distance and implementing the omni-directional transmission. Furthermore, in other embodiments of the present disclosure, the transmitting directions of the antennas 131~134 may be adjusted according to the actual situation. However, the disclosure is not limited by the embodiments.

For transmitting or receiving the vertically/horizontally polarized signals, the expansion assembly 199 is configured to include a first switching unit 140 and a second switching unit 150. The first switching unit 140 connects with the first power divider and combiner 101. The first switching unit 140 is controlled for transmitting or receiving of the vertically polarized signals. The second switching unit 150 connects with the second power divider and combiner 150. The second switching unit 150 is controlled for transmitting or receiving of the horizontally polarized signals. It is noted that the present disclosure is not limited by the this embodiment. In other embodiments, the first switching unit 140 may be controlled for transmitting or receiving of the horizontally polarized signals, and the second switching unit 150 may be controlled for transmitting or receiving of the vertically polarized signals.

The first switching unit 140 and the second switching unit 150 connect with each other. The node between the first switching unit 140 and second switching unit 150 connects with the first RF front end units 111~114 and the second RF front end units 121~124. Thus, the first switching unit 140 and the second switching unit 150 are configured to control the first RF front end units 111~114 for transmitting/receiving the vertically polarized signals selectively, and are configured to control the second RF front end units 121~124 for transmitting/receiving the horizontally polarized signals selectively.

The first power divider and combiner 101 includes a first power dividing and combing part 1011, a second power dividing and combing part 1012 and a third power dividing and combing part 1013. The second power divider and combiner 102 includes a fourth power dividing and combing part 1021, a fifth power dividing and combing part 1022 and a sixth power dividing and combing part 1023. The first power dividing and combing part 1011 connects with the second power dividing and combing part 1012, third power dividing and combing part 1013 and first switching unit 140. The fourth power dividing and combing part 1021 connects with the fifth power dividing and combing part 1022, the sixth power dividing and combing part 1023 and the second switching unit 150. Furthermore, the second power dividing and combing part 1012 connects with the first RF front end units 111 and 112. The third power dividing and combing part 1013 connects with the first RF front end units 113 and 114. The fifth power dividing and combing part 1022 connects with the second RF front end units 121 and 122. And the sixth power dividing and combing part 1023 connects with the second RF front end units 123 and 124.

Accordingly, the vertically polarized signals are delivered to the first RF front end units 111~114 through the first power dividing and combing part 1011, the second power dividing and combing part 1012 and the third power dividing and combing part 1013, At the same time, the horizontally polarized signals are delivered to the second RF front end units 121~124 through the fourth power dividing and combing part 1021, the fifth power dividing and combing part 1022 and the sixth power dividing and combing part 1023. After the vertically polarized signals pass the first power dividing and combing part 1011, the second power dividing and combing part 1012 and the third power dividing and combing part 1013, the power loss of the vertically polarized signals may be compensated by the first RF front end units 111 to 114. After the horizontally polarized signals pass the fourth power dividing and combing part 1021, the fifth power dividing and combing part 1022 and the sixth power dividing and combing part 1023, the power loss of the horizontally polarized signals may be compensated by the second RF front end units 121 to 124. Then, the compensated signals may be transmitted for longer distance by using the antennas 131 to 134. Therefore, according to this disclosure, the MIMO wireless communication system using the expansion assembly 199 is capable of implementing the omni-directional transmission and is capable of increasing the transmitting distance.

Figure 2:
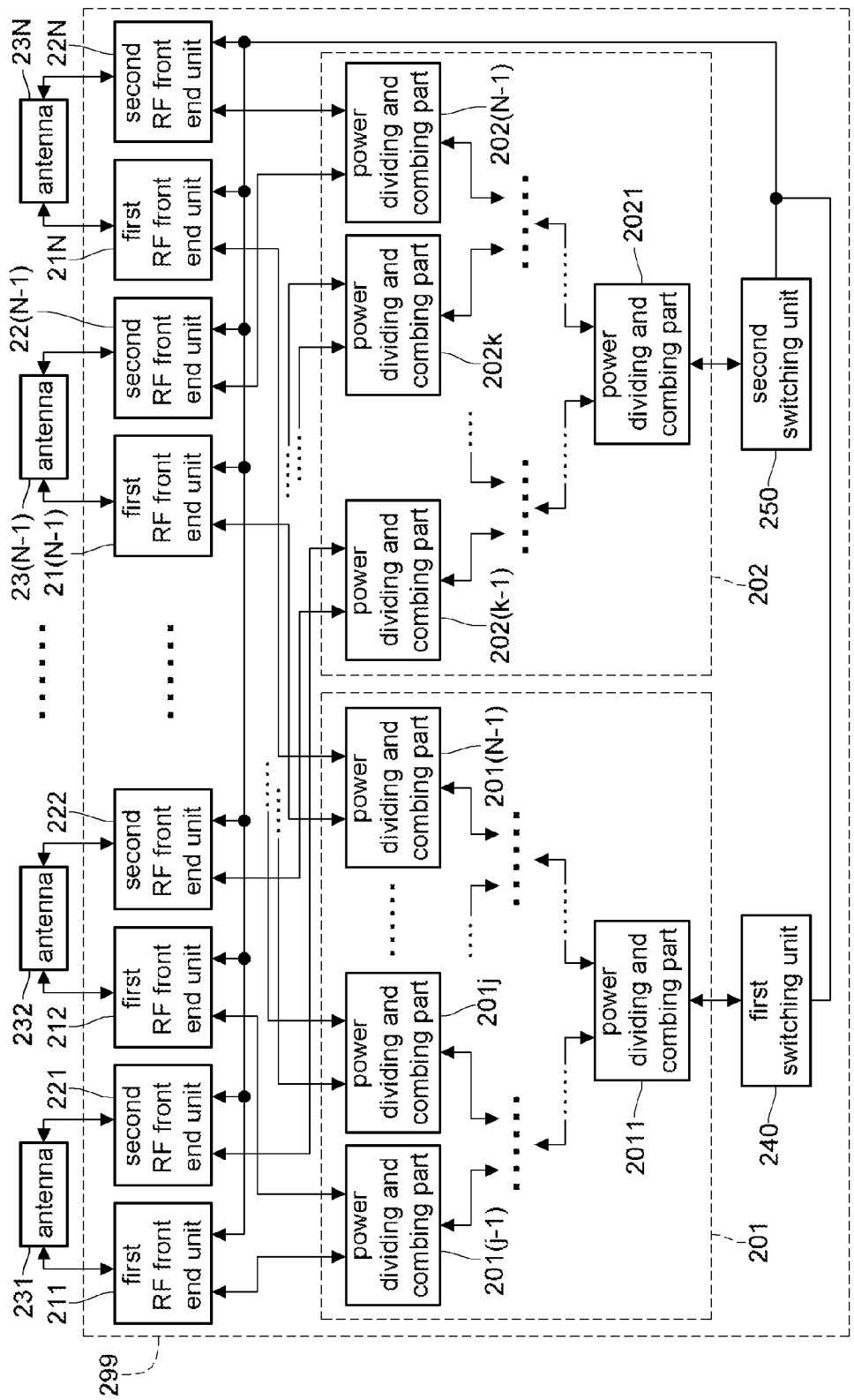
FIG. 2 is a structural diagram of an expansion assembly system according to another embodiment of the present disclosure.

Referring FIG. 2, which is a structural diagram of the expansion assembly of another embodiment in the present disclosure. The expansion assembly shown in FIG. 2 is formed by a repeated application of the expansion assemblies as shown in FIG. 1. In this embodiment, the expansion assembly 299 includes: N first RF front end units 211 to 21N, N second RF front end units 221 to 22N, a first power divider and combiner 201, and a second power divider and combiner 202. N is a integer greater than two.

The first RF front end unit 211 connects with an antenna 231, the second RF front end unit 212 connects with an antenna 232, a first RF front end unit 21i connects with an antenna 23i, and the first RF front end unit 21N connects with an antenna 23N. At the same time, the second RF front end unit 221 connects with the antenna 231, the second RF front end unit 222 connects with the antenna 232, a second RF front end unit 22i connects with an antenna 23i, and the second RF front end unit 22N connects with the antenna 23N. Wherein, i is a positive integer less than N.

In this embodiment, the antennas 231 to 23N are orthogonal dual-polarized antennas, configured to transmit or receive a first signal polarized in a first direction and a second signal polarized in a second direction. Here, the electric field of the first signal polarized in a first direction is perpendicular to the electric field of the second signal polarized in a second direction. For example, the polarized signals are obtained by a vertically polarization and a horizontally polarization. In another example, the polarized signals are obtained by a 45° polarization and a −45° polarization. It should be noted that the disclosure is not limited by the embodiments.

The first power divider and combiner 201 connects with each of the first RF front end units 211 to 21N, for delivering the first signal polarized in a first directions to the first RF front end units 211 to 21N. Alternatively, the first power divider and combiner 201 is capable of combing the first signal polarized in a first directions from the second RF front end units 211 to 21N. The second power divider and combiner 202 connects with each of the second RF front end units 221 to 22N, in order to deliver the second signal polarized in a second direction to the second RF front end units 221 to 22N or combing the second signal polarized in a second directions from the second RF front end units 221 to 22N.

Each of the first RF front end units 211~21N and the second RF front end units 221~22N has a power amplifier and a low-noise amplifier. Accordingly, the power loss of the first signal polarized in a first direction during the delivering process may be compensated by the first RF front end units 211~21N. And the power loss of the second signal polarized in a second direction during the delivering process may be compensated by the second RF front end units 221~22N. Then, the first and second signal polarized in a second directions are capable of being transmitted by the antennas 231~23N. By this way, the transmitting distance is increased.

Furthermore, the expansion assembly 299 includes a first switching unit 240 and a second switching unit 250. The first switching unit 240 connects with the first power divider and combiner 201, for controlling the first power divider and combiner 201 to deliver or combine the first signal polarized in a first direction. The second switching unit 250 connects with the second switching unit 202, for controlling the second switching unit 202 to deliver or combine the second signal polarized in a second directions. The first switching unit 240 and the second switching unit 250 connect with each other. The node between the first switching unit 240 and second switching unit 250 connects with each of the first RF front end unit 211~21N and each of the 221~22N. Accordingly, based on a controlling signal sent from the node, the first switching unit 240 and the second switching unit 250 of the expansion assembly 299 are configured to control the second RF front end units 211~21N for transmitting or receiving the first signal polarized in a first direction and are configured to control the second RF front end units 221~22N for transmitting or receiving the second signal polarized in a second direction.

The antennas 231~23N are suitable for transmitting or receiving signals in different spatial domains. In this embodiment, the antennas 231~23N are capable of providing different spatial domains covering 360 degrees. Therefore, in addition to providing the further transmitting distance, the MIMO wireless communication system has the advantage of implementing the omni-directional transmission.

The first power divider and combiner 201 further includes a plurality of first power dividing and combing parts 2011~201j, wherein j is a positive integer and j=N−1. The second power divider and combiner 202 includes a plurality of second power dividing and combing parts 202-20k, wherein k is a positive integer and k=N−1. Each of the first power dividing and combing parts 2011-201j is capable of delivering the first signal polarized in a first direction to at least two back-end elements. Each of the second power dividing and combing parts 2021-202k is capable of delivering the second signal polarized in a second direction to at least two back-end elements. By this configuration, the first power divider and combiner 201 is capable of delivering the first signal polarized in a first direction to each of the second RF front end units 211-21N, and the second power divider and combiner 202 is capable of delivering the second signal polarized in a second direction to each of the second RF front end units 221-22N. The power loss of the first and second signal polarized in a second directions caused in the delivering process is capable of being compensated by the first RF front end units 211-21N and the second RF front end units 221-22N. Then, the signals are capable being transmitted by the antennas 213-23N. Therefore, the transmitting distance is increased.

Accordingly, in the expansion assembly of the present disclosure, the first power divider and combiner is configured to be connected with each of the first RF front end units, thus the first signal polarized in a first directions is capable of being delivered to the first RF front end units and the power loss caused in the delivering process is capable of being compensated by the first RF front end units. At the same time, the second power delivering combing unit is configured to be connected with each of the second RF front end units; thus the second signal polarized in a second direction may be delivered to the second RF front end units and the power loss caused in the delivering process may be compensated by the second RF front end units. Combining with various types of antennas for different spatial domains, the expansion assembly is capable of covering a transmitting area having 360 degrees. Accordingly, the expansion assembly has the advantages of increasing the transmitting distance and implementing the omni-directional transmission.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A expansion assembly comprising:
   N first radio frequency (RF) front end units connected with a first port in each of N antennas, wherein each of the first RF front end units processes a first signal polarized in a first direction, where N is an integer;
   N second RF front end units connected with a second port in each of the antennas, wherein each of the second RF front end units processes a second signal polarized in a second direction;
   a first power divider and combiner configured to deliver and combine the first signal polarized in a first direction, the first power divider and combiner connected with each of the first power RF front end units; and
   a second power divider and combiner unit configured to deliver and combine the second signal polarized in a second direction, the second power deliver divider and combiner unit connected with each of the second power RF front end units.

2. The expansion assembly according to claim 1, further comprising:
   a first switching unit, connected with the first power divider and combiner, wherein the first switching unit is controlled for transmitting or receiving of the first signal polarized in a first direction; and
   a second switching unit, connected with the second power divider and combiner, wherein the second switching unit is controlled for transmitting or receiving of the second signal polarized in a second direction,
   wherein a node between the first switching unit and the second switching unit being connected with each of the first power RF front end units and each of the second power RF front end units, so as to control the transmitting and the receiving of the first and second signal polarized in a second directions.

3. The expansion assembly according to claim 1, wherein each of the first and the second RF front end units comprises a power amplifier and a low-noise amplifier.

4. The expansion assembly according to claim 1, wherein each of the antennas is a dual-polarized antenna.

5. The expansion assembly according to claim 1, wherein each of the antennas transmits or receives signals in different spatial domains.

6. The expansion assembly according to claim 5, wherein a combination of the spatial domains covers 360 degrees.

7. The expansion assembly according to claim 6, wherein the first power divider and combiner comprises a plurality of first power dividing and combing parts, and the second power divider and combiner comprises a plurality of second power dividing and combing parts.

8. The expansion assembly according to claim 7, wherein the number of the plurality of first power dividing and combing parts is three, and the number of the plurality of second power dividing and combing part is three.

9. The expansion assembly according to claim 8, wherein one of the plurality of first power dividing and combing parts connects with other two first power dividing and combing parts, and wherein one of the plurality of second power dividing and combing parts connects with other two second power dividing and combing parts.

10. The expansion assembly according to claim 8, wherein the number of the antennas is four.

* * * * *